US009091763B2

(12) United States Patent
Mills (10) Patent No.: US 9,091,763 B2
(45) Date of Patent: Jul. 28, 2015

(54) WEATHER DETECTION USING SATELLITE COMMUNICATION SIGNALS

(71) Applicant: ViaSat, Inc., Carlsbad, CA (US)

(72) Inventor: Raymond L. Mills, Calhan, CO (US)

(73) Assignee: ViaSat, Inc., Carlsbad, CA (US)

( * ) Notice: Subject to any disclaimer, the term of this patent is extended or adjusted under 35 U.S.C. 154(b) by 0 days.

(21) Appl. No.: 14/247,766

(22) Filed: Apr. 8, 2014

(65) Prior Publication Data

US 2014/0300510 A1  Oct. 9, 2014

Related U.S. Application Data

(63) Continuation of application No. 12/544,121, filed on Aug. 19, 2009, now Pat. No. 8,730,086.

(60) Provisional application No. 61/091,984, filed on Aug. 26, 2008.

(51) Int. Cl.
| | |
|---|---|
| G01S 13/95 | (2006.01) |
| G01W 1/10 | (2006.01) |
| H04B 7/185 | (2006.01) |
| H04W 52/24 | (2009.01) |
| G01W 1/04 | (2006.01) |

(52) U.S. Cl.
CPC .............. *G01S 13/955* (2013.01); *G01W 1/04* (2013.01); *G01W 1/10* (2013.01); *H04B 7/18513* (2013.01); *H04W 52/245* (2013.01)

(58) Field of Classification Search
CPC .............. G01S 13/955; H04W 52/245; H04B 7/18513; G01W 1/04; G01W 1/10
USPC ......................................................... 342/26 A
See application file for complete search history.

(56) References Cited

U.S. PATENT DOCUMENTS 3,896,382 A * 7/1975 Magenheim ................. 455/13.3
4,041,397 A   8/1977 Bauer et al.
(Continued)

FOREIGN PATENT DOCUMENTS

EP  0762637 A2  3/1997
EP  0837569 A2  4/1998
(Continued)

OTHER PUBLICATIONS

Cable Television Laboratories, Inc., Data Over Cable Service Interface Specifications DOCSIS 3.0: Physical Layer Specification, CM-SP-PHYv 3.0-107-080522, May 22, 2008. CableLabs, 170 pgs.
(Continued)

*Primary Examiner* — Matthew M Barker
(74) *Attorney, Agent, or Firm* — Holland & Hart LLP (57) ABSTRACT

Disclosed is a satellite weather detection system that uses atmospheric precipitation density data. Subscribers detect the signal strength and signal-to-noise ratio of signals that are transmitted from the satellite. Upstream transmit power data is also collected, which is needed to achieve a given SNR at a gateway. The values of the downstream signal strength and signal-to-noise ratio data as well as the upstream transmit power data are normalized and compared with current atmospheric data. The data can be color coded and graphically displayed to show weather patterns. Location and velocity of high precipitation density cells can be tracked to predict movement of storms.

20 Claims, 5 Drawing Sheets

(56) References Cited

U.S. PATENT DOCUMENTS

| | | | |
|---|---|---|---|
| 4,287,598 A * | 9/1981 | Langseth et al. | 455/505 |
| 4,858,229 A | 8/1989 | Rosen et al. | |
| 4,896,369 A | 1/1990 | Adams, Jr. et al. | |
| 4,910,792 A | 3/1990 | Takahata et al. | |
| 5,465,410 A | 11/1995 | Hiben et al. | |
| 5,550,550 A | 8/1996 | Das | |
| 5,839,050 A | 11/1998 | Baehr et al. | |
| 5,987,233 A | 11/1999 | Humphrey | |
| 5,991,306 A | 11/1999 | Burns et al. | |
| 5,991,622 A | 11/1999 | Henry, Jr. | |
| 6,047,171 A | 4/2000 | Khayrallah et al. | |
| 6,169,513 B1 | 1/2001 | Cohen | |
| 6,169,881 B1 * | 1/2001 | Astrom et al. | 455/12.1 |
| 6,192,240 B1 * | 2/2001 | Tayloe et al. | 455/428 |
| 6,272,340 B1 * | 8/2001 | Wright et al. | 455/427 |
| 6,308,043 B1 * | 10/2001 | Solheim et al. | 455/63.1 |
| 6,434,609 B1 | 8/2002 | Humphrey | |
| 6,442,598 B1 | 8/2002 | Wright et al. | |
| 6,546,488 B2 | 4/2003 | Dillon et al. | |
| 6,601,090 B1 | 7/2003 | Gurijala et al. | |
| 6,618,751 B1 | 9/2003 | Challenger et al. | |
| 6,658,463 B1 | 12/2003 | Dillon et al. | |
| 6,678,791 B1 | 1/2004 | Jacobs et al. | |
| 6,763,006 B1 | 7/2004 | Lockett | |
| 6,947,440 B2 | 9/2005 | Chatterjee et al. | |
| 7,039,683 B1 | 5/2006 | Tran et al. | |
| 7,047,029 B1 * | 5/2006 | Godwin et al. | 455/505 |
| 7,289,062 B2 | 10/2007 | Hudson et al. | |
| 7,359,395 B2 | 4/2008 | Toporek et al. | |
| 7,516,236 B2 | 4/2009 | Walsh et al. | |
| 7,532,860 B2 | 5/2009 | Loner | |
| 7,586,438 B1 * | 9/2009 | Lawrence et al. | 342/357.4 |
| 7,599,658 B1 * | 10/2009 | Agarwal et al. | 455/13.4 |
| 7,728,759 B2 | 6/2010 | Tillotson et al. | |
| 7,773,942 B2 | 8/2010 | Hudson et al. | |
| 8,131,212 B2 * | 3/2012 | Laufer | 455/13.4 |
| 8,149,761 B2 | 4/2012 | Hudson et al. | |
| 8,411,798 B2 | 4/2013 | Sahai et al. | |
| 8,538,328 B2 | 9/2013 | Mills et al. | |
| 8,730,086 B2 | 5/2014 | Mills | |
| 2001/0052015 A1 | 12/2001 | Lin et al. | |
| 2002/0006116 A1 | 1/2002 | Burkhart | |
| 2002/0073167 A1 | 6/2002 | Powell et al. | |
| 2002/0143984 A1 | 10/2002 | Hudson Michel | |
| 2004/0224633 A1 | 11/2004 | Coromina et al. | |
| 2006/0064726 A1 * | 3/2006 | Loner | 725/68 |
| 2007/0037512 A1 | 2/2007 | Godwin | |
| 2008/0055152 A1 | 3/2008 | Hudson et al. | |
| 2008/0055153 A1 | 3/2008 | Hudson et al. | |
| 2008/0056176 A1 | 3/2008 | Hudson et al. | |
| 2008/0056189 A1 | 3/2008 | Hudson et al. | |
| 2010/0052919 A1 | 3/2010 | Mills | |
| 2010/0062706 A1 | 3/2010 | Mills et al. | |
| 2010/0112974 A1 | 5/2010 | Sahai et al. | |

FOREIGN PATENT DOCUMENTS

| | | |
|---|---|---|
| GB | 1223163 A | 2/1971 |
| JP | 04132993 A | 5/1992 |
| JP | 04204193 A | 7/1992 |
| WO | WO-9918678 A1 | 4/1999 |
| WO | WO-9963711 A1 | 12/1999 |
| WO | WO-0046682 A1 | 8/2000 |
| WO | WO-04002016 A2 | 12/2003 |
| WO | WO-2005067367 A2 | 7/2005 |
| WO | WO-2008027974 A2 | 3/2008 |

OTHER PUBLICATIONS

European Telecommunications Standards Institute, Digital Video Broadcasting (DVB); Second Generation Framing Structure, Channel Coding and Modulation Systems for Broadcasting, Interactive Services, News Gathering and Other Broadband Satellite Applications, Draft ETSI EN 302 307 v1.1.1 (Jun. 2004). Sophia Antipolis Cedex, France, 74 pgs.

European Telecommunications Standards Institute, Digital Video Broadcasting (DVB); Second Generation Framing Structure, Channel Coding and Modulation Systems for Broadcasting, interactive Services, News Gathering and Other Broadband Satellite Applications, ETSI EN 302 307 v1.1.2 (Jun. 2006), Sophia Antipolis Cedex, France 74 pgs.

ISA/EPO, International Search Report and Written Opinion of the International Searching Authority, Int'l Patent App. No. PCT/US2007/077124, Jul. 22, 2008, European Patent Office, Rijswijk, NL 17 pgs.

Patent Abstract of Japan, vol. 012, No. 461 (E-689), Dec. 5, 1988, and JP 63 185129 A (NEC Corporation), Jul. 30, 1988 (see abstract).

Patent Abstracts of Japan, vol. 012, No. 452 (E-687) Nov. 28, 1988, and JP 63 179629 A (Nippon Telegraph and Telephone Corporation), Jul. 23, 1988 (see abstract).

U.S. Appl. No. 61/091,984, filed Aug. 26, 2008.
U.S. Appl. No. 61/095,979, filed Sep. 11, 2008.
U.S. Appl. No. 61/100,206, filed Sep. 25, 2008.
U.S. Appl. No. 60/840,809, filed Aug. 29, 2006.

* cited by examiner

"WEATHER DETECTION USING SATELLITE COMMUNICATION SIGNALS

CROSS REFERENCES

The present application is a continuation of U.S. patent application Ser. No. 12/544,121, filed Aug. 19, 2009, by Raymond L. Mills, entitled "Weather Detection Using Satellite Communication Signals," which claims the benefit of U.S. provisional patent application Ser. No. 61/091,984, filed Aug. 26, 2008, by Raymond L. Mills, entitled "Weather Detection Using Satellite Communication Signals," each of which are assigned to the assignee hereof, and expressly incorporated by reference herein.

BACKGROUND OF THE INVENTION

Satellite technology has been used for a number of years for communication purposes. For example, satellites have been used to transmit television signals, Internet data, telephone signals, navigational signals and other data. Satellites have the advantage of being able to transmit communication data to the most remote parts of the world without topographical interference.

SUMMARY OF THE INVENTION

An embodiment of the present invention may therefore comprise a method of detecting atmospheric precipitation density using signal-to-noise ratio data relating to the signal-to-noise ratio of subscriber received signals transmitted from a satellite to subscribers at subscriber locations comprising: receiving the subscriber received signals at the subscriber locations; generating the signal-to-noise ratio data relating to the signal-to-noise ratio of the subscriber received signals; transmitting the signal-to-noise ratio data from the subscribers to a central office; normalizing the signal-to-noise ratio data by averaging the signal-to-noise ratio data over a plurality of time periods to produce averaged signal-to-noise ratio data; comparing the signal-to-noise ratio data for a current time period with the averaged signal-to-noise ratio data to generate differential signal-to-noise ratio data that is representative of atmospheric precipitation density.

An embodiment of the present invention may further comprise a method of detecting atmospheric precipitation density using signal strength data relating to the signal strength of subscriber received signals transmitted from a satellite to subscribers at subscriber locations comprising: receiving the subscriber received signals at the subscriber locations; generating the signal strength data relating to the signal strength of the subscriber received signals; transmitting the signal strength data from the subscribers to a central office; normalizing the signal strength data by averaging the signal strength data over a plurality of time periods to produce averaged signal strength data; comparing the signal strength data for a current time period with the averaged signal strength data to generate differential signal strength ratio data that is representative of atmospheric precipitation density.

An embodiment of the present invention may further comprise a system for detecting atmospheric precipitation density using signal-to-noise ratio data relating to the signal-to-noise ratio of downstream signals transmitted from a satellite to subscribers at known subscriber locations comprising: a subscriber transceiver that receives the downstream signal and transmits an upstream signal; a subscriber modem that receives the downstream signals from the transceiver, determines the signal-to-noise ratio data of the downstream signal and encodes the upstream signal with the signal-to-noise ratio data; a control system that receives the upstream signal, extracts the signal-to-noise ratio data from the upstream signal and has a processor that normalizes the signal-to-noise ration data by averaging the signal-to-noise ratio data over a plurality of time periods to produce averaged signal-to-noise ration data, compares the signal-to-noise ration data for a current time period with the averaged signal-to-noise ration data to generate differential signal-to-noise ratio data that is representative of atmospheric precipitation density.

An embodiment of the present invention may further comprise a system for detecting atmospheric precipitation density using signal strength data relating to the signal strength of downstream signals transmitted from a satellite to subscribers at known subscriber locations comprising: a subscriber transceiver that receives the downstream signal and transmits an upstream signal; a subscriber modem that receives the downstream signals from the transceiver, determines the signal strength data of the downstream signal and encodes the upstream signal with the signal strength data; a control system that receives the upstream signal, extracts the signal strength data from the upstream signal and has a processor that normalizes the signal strength data by averaging the signal strength data over a plurality of time periods to produce averaged signal strength data, compares the signal strength data for a current time period with the averaged signal strength data to generate differential signal strength data that is representative of atmospheric precipitation density.

DETAILED DESCRIPTION OF THE INVENTION

Figure 1A:
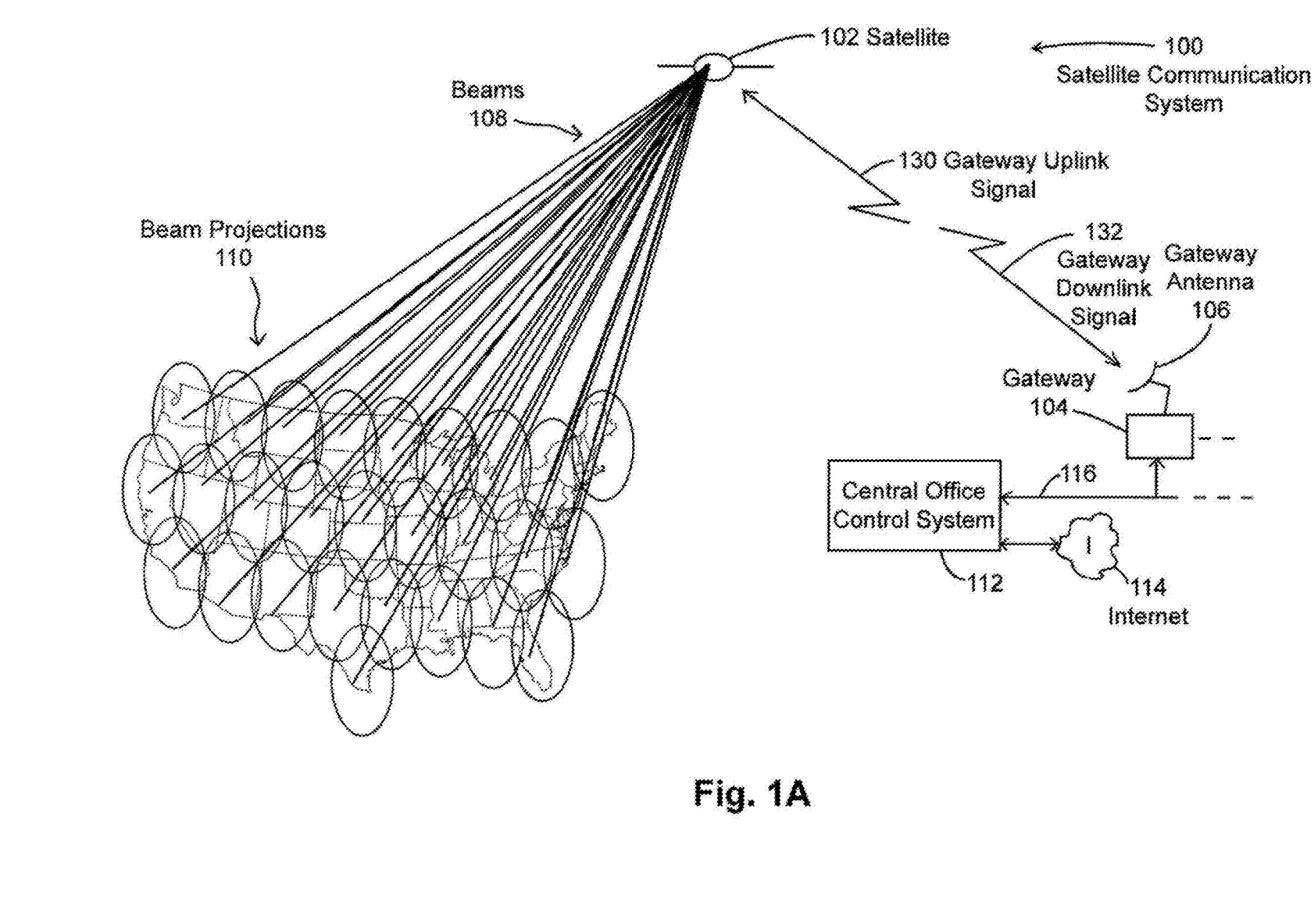
FIG. 1A is a schematic representation of an embodiment of a satellite communication system.

FIG. 1A is a schematic illustration of one embodiment of a satellite communication system. The satellite communication system is a bidirectional system, such as that used by Wild Blue Communications Inc., located at 5970 Greenwood Plaza Blvd., Suite 300, Greenwood Village, Colo. 80111, that delivers and receives Internet data. In accordance with the system illustrated in FIG. 1, satellite 102 has a series of antennas that project beams 108 over the USA and receive signals from subscribers located within the beam projections 110 which cover most of the area of the USA. The antennas on the satellite 102 are mounted on several different antenna arrays (pallets). Some systems allow individual adjustment of antennas. The antenna arrays mounted on the satellite 102 both send and receive data so that data can be transmitted downstream to subscribers on the ground and transmitters disposed at the subscriber location can transmit data upstream to the satellite 102.

Gateway 104, illustrated in FIG. 1A, uses antenna 106 to transmit gateway uplink signals 130 to the satellite 102 via the gateway antenna 106. The gateway uplink signal is referred to as a downstream signal since it is sent downstream from the central office control system to the subscriber. Similarly, gateway 104 receives gateway downlink signals 132 from satellite 102, which is an upstream signal. As indicated in FIG. 1A, there may be more than one gateway that transmits and receives data to and from satellite 102. For example, the embodiment illustrated in FIG. 1A may have 11 gateways at 7 different locations. A high speed, wideband ground connection 116 is provided between the central office control system 112 and the gateways, such as gateway 104. Central office control system 112 operates and controls the satellite communication system 100, illustrated in FIG. 1A, and is connected to the Internet 114.

Figure 1B:
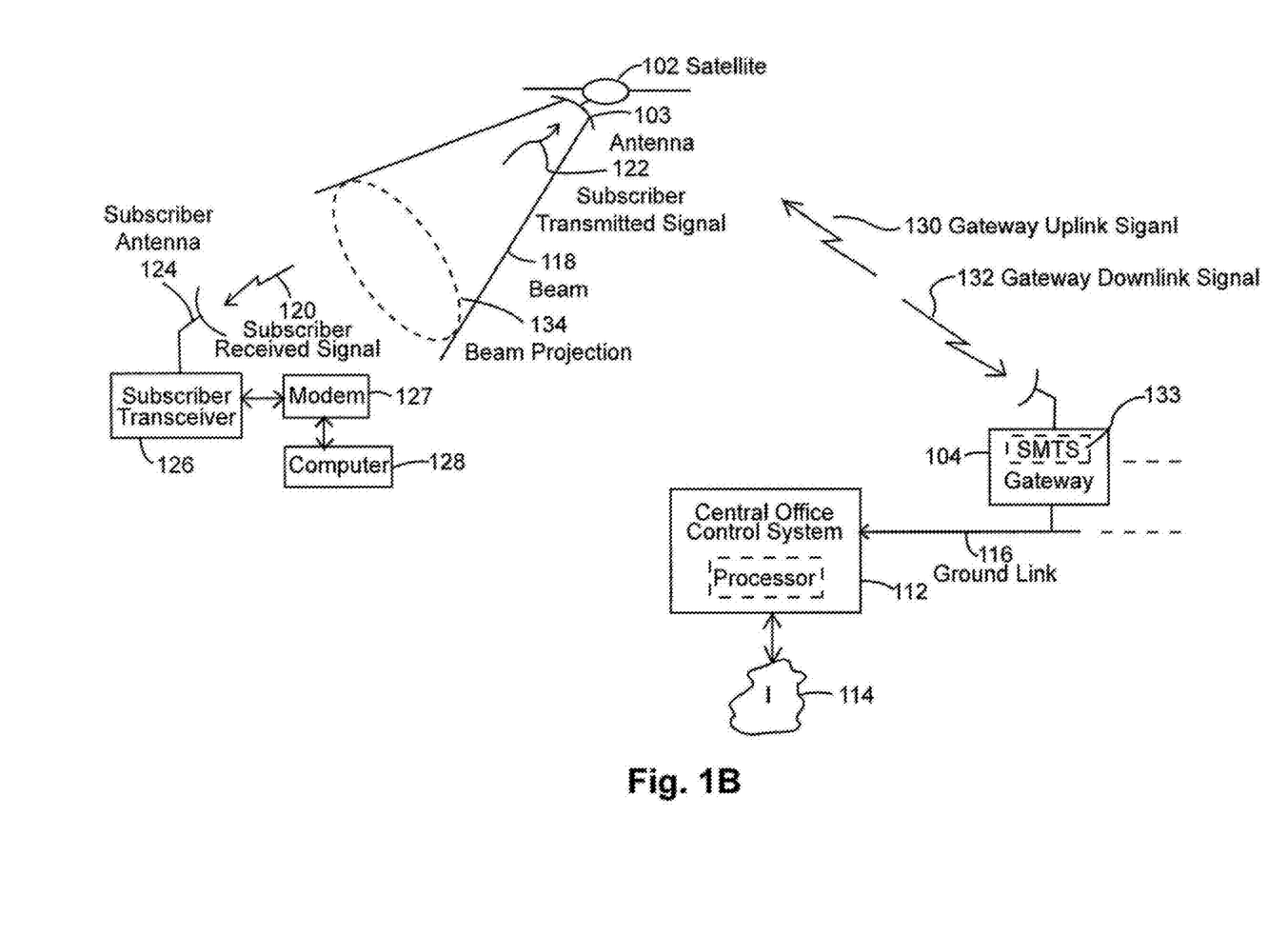
FIG. 1B is a schematic representation of the satellite communication system of FIG. 1A illustrating a single subscriber.

FIG. 1B illustrates a single beam 118, of the plurality of beams 108 (FIG. 1A), and a single subscriber located within the beam projection 134 of beam 118. The subscriber has a subscriber antenna 124 that is connected to a subscriber transceiver 126, which is connected to modem 127. Modem 127 is connected, in turn, to the subscriber computer 128. Transceiver 126 receives and transmits signals via subscriber antenna 124. Modem 127 processes data and controls the operation of transceiver 126. The subscriber computer 128 transmits and receives signals to and from modem 127. Transceiver 126 transmits the subscriber transmitted signal 122 (upstream signal) to the satellite 102 at 30 GHz. Similarly, transceiver 126 receives the subscriber received signal 120 (downstream signal) from the satellite 102 at 20 GHz. Beam 118 creates a beam projection 134 on the surface of the earth as a result of the focused antenna 103, which is one of a number of focused antennas mounted on the satellite 102 that create beam 108 and beam projections 110 (FIG. 1A), including beam projection 134. Antenna 103 is capable of transmitting the subscriber received signal 120 from the satellite 102 and receiving the subscriber transmitted signal 122.

The satellite 102 also includes antennas (not shown) that are directed specifically at the gateways. For example, a separate antenna on satellite 102 is used to transmit the gateway downlink signal 132 to gateway 104 and receive the gateway uplink signal 130 from gateway 104. The gateway 104 includes a satellite modem termination system 133 that obtains data from the subscriber modem 127 every two seconds. The satellite modem termination system, that is disposed in the gateways, provides data on a periodic basis, such as at 15-minute increments, to the central office control system 112 where the data is processed by a processor 112. Process 112 may comprise a bank of high speed computers that are programmed to perform the various processing functions disclosed herein. This data includes the signal power of the subscriber received signal 120 at the subscriber transceiver 126, which is referred to as the downstream power data, as well as the signal-to-noise ratio of the subscriber received signal 120, which is referred to as the downstream SNR data.

Since the subscriber received signal 120 is transmitted at 20 GHz, precipitation density in the atmosphere will cause the subscriber received signal 120 to be attenuated. Atmospheric precipitation density will also lower the signal-to-noise ratio of the subscriber received signal. Hence, the downstream power data and the downstream SNR data, that is derived from the subscriber received signal 120, provide information relating to atmospheric precipitation density. For example, if a severe thunderstorm is located between the subscriber antenna 124 and antenna 103 on satellite 102, the downstream power data and the downstream SNR data will indicate the level of precipitation density. In operation, when the transceiver 126 receives the subscriber received signal 120 via the subscriber antenna 124, the modem 127 determines the signal strength and signal-to-noise ratio of the subscriber received signal 120 and generates the downstream power data and downstream SNR data which the modem 127 encodes in the subscriber transmitted signal 122.

The subscriber transmitted signal 122 is also encoded by modem 127 with data indicating the power at which the subscriber transceiver 126 transmits the subscriber transmitted signal 122. The modem 127 controls the power level at which the transmitter of the subscriber transceiver 126 transmits power. The modem encodes the transmitted power data, which is referred to as the upstream transmit power data, in the subscriber transmitted signal 122 that is transmitted to the satellite 102 and subsequently to the satellite termination modem system 133 in the gateway 104. The satellite modem termination system 133 detects and records this upstream transmission power data and provides the upstream transmission power data to the central office control system 112 on a periodic basis. In operation, the modem 127 sets the transmitter of the subscriber transceiver 126 at a target value. When atmospheric precipitation is encountered by the subscriber transmitted signal 122, the precipitation density tends to attenuate the subscriber transmitted signal 122. In response, the central office control system 112 detects this reduction via satellite modem termination system 133, and transmits a control signal to the modem 127 to increase power output. In this manner, the subscriber transmitted signal 122 is increased to have sufficient power, even though there is precipitation in the atmosphere between the subscriber antenna 124 and the satellite antenna 103. The reduction in power of the upstream transmit power data provides an indication of precipitation density between the subscriber antenna 124 and the satellite antenna 103.

Hence, the three types of data, i.e., the downstream power data, the downstream SNR data, and the upstream transmit power data, which are referred to as atmospheric precipitation density data, provide valuable information regarding the precipitation density in the atmosphere that is encountered by the subscriber received signal 120 and the subscriber transmitted signal 122. The central office control system 112 maintains a record of these three different types of data which the central office control system 112 processes for the purpose of displaying atmospheric precipitation density and weather patterns throughout the USA, as well as other functions.

In systems where interference occurs between adjacent beams, the signal-to-noise ratio data is a more reliable metric for determining atmospheric precipitation density. The signal-to-noise ratio data provides higher resolution than signal strength data because of the interference problems with adjacent beams. Hence, the signal-to-noise ratio data is more accurate than the signal strength data when interference is present. However, in systems that are not affected by interference, signal strength may be a better metric for determining atmospheric precipitation density. Thus, either the signal strength data or signal-to-noise ratio data can be used to determine atmospheric precipitation density. When displaying the atmospheric precipitation density data, a color encoding scheme may be used based upon different levels of the signal-to-noise ratio or signal strength to provide a visual display of the signal-to-noise ratio data or signal strength data from each of the cells 202 illustrated in FIG. 2.

Figure 2:
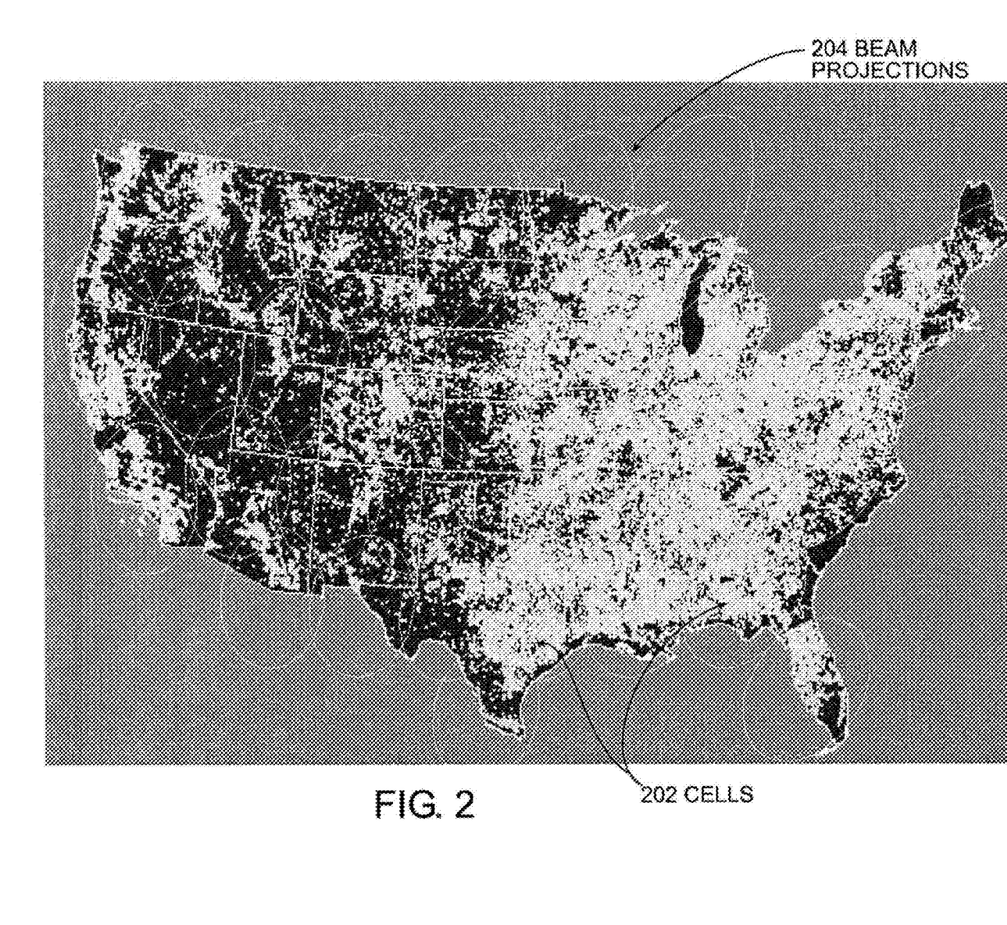
FIG. 2 is a schematic illustration of beam projections and a plurality of cells over the USA.

FIG. 2 illustrates the beam projections 204, as well as active cells of the communication system of FIG. 1A throughout the USA. In many locations, as illustrated in FIG. 2, the cells 202 in the grid of cells that span the USA are populated with at least one subscriber so that many cells provide data to the central office control system 112. The central office control system 112 color codes and displays the data, and may provide additional processing to track the movement of storms. For example, the system operated by Wild Blue Communications, Inc. has over 300,000 subscribers spread throughout the USA. Since the cells 214-252 are color-coded and there are many of these cells that are populated by subscribers, an accurate depiction of the precipitation density and weather can be easily discerned throughout the country from the displayed color-coded data.

A process of normalizing precipitation density data is required as a result of variations in subscriber equipment and roll off of signal power as the distance of the subscriber equipment increases from the beam center of the beam projections. The three forms of atmospheric precipitation density data, i.e., downstream power data, downstream SNR data and upstream transmit power data, are provided by the satellite modem termination system 133 to the central office control system 112 on a periodic basis. The central office control system 112 records each of those forms of data from each cell and averages that data over the previous 12 hour period. The current data is then compared to the average data and the difference is encoded as a color signal which is displayed on a display at the central office control system 112.

Figure 3:
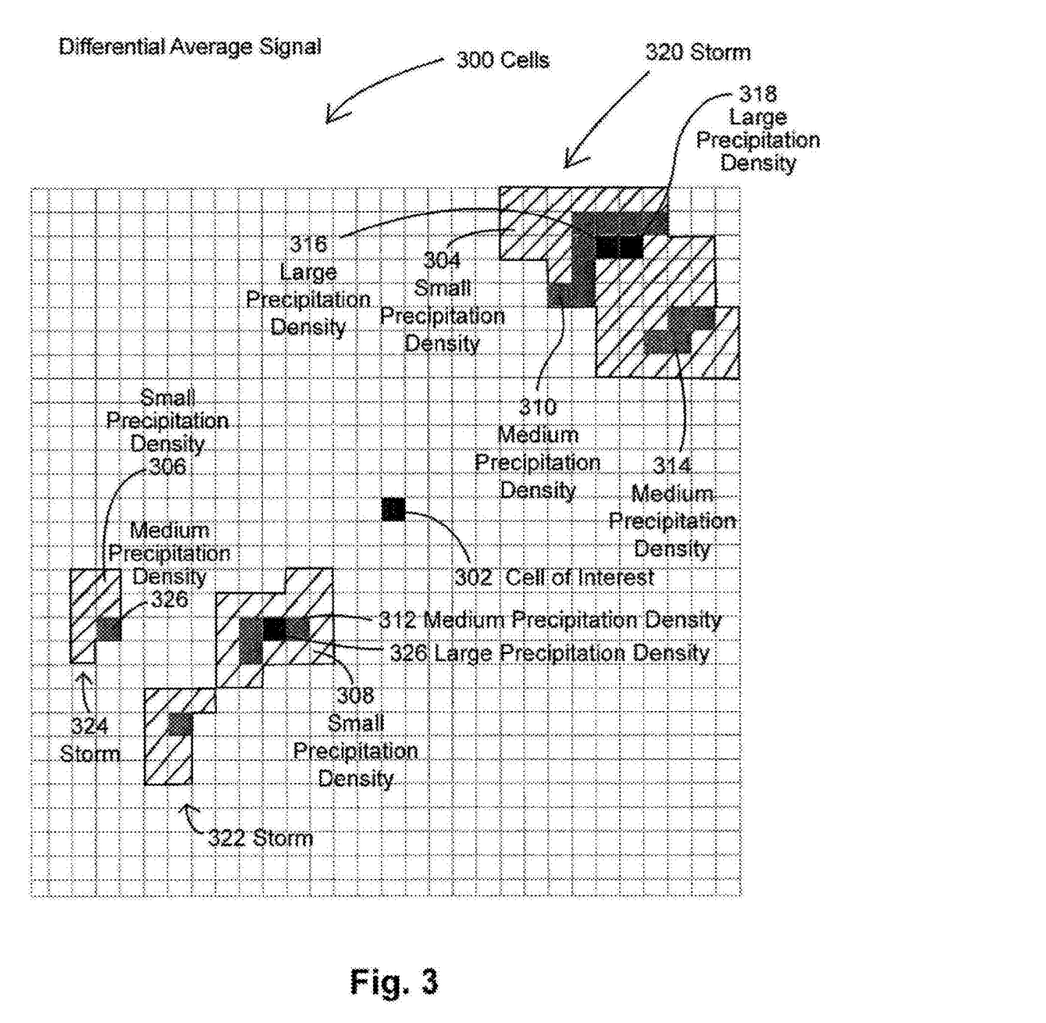
FIG. 3 is a schematic illustration of a subset of a plurality of cells that cover the USA.

FIG. 3 is a schematic illustration of a subset of a plurality of cells 300 that form a grid of cells that cover most of the terrestrial area of the United States, as shown in FIG. 2. Each of the cells 300 spans a tenth of a degree in both latitude and longitude to form the substantially rectangular shape illustrated for each of the cells shown in FIG. 3. Each of the cells 300 may have one or more subscribers located within the boundaries of the cells. The subscribers are individuals or businesses that subscribe to the communication services provided by the communication system illustrated in FIG. 1. The size of the cells 300 is such that, in more populated areas, where there are more subscribers, up to several hundred subscribers may exist in a single cell. In more rural areas, only one or several subscribers may exist in a cell. In some rural areas, there are no subscribers for some cells. Hence, multiple sets of precipitation density data may be collected for some cells, while other cells may produce only one set of data or no data.

FIG. 3 also illustrates the manner in which precipitation density data can be accurately displayed for each cell to illustrate weather patterns. In order to determine the precipitation density for any particular cell of the cells 300 that are illustrated in FIG. 3, the data must be normalized. In other words, the data for each cell must be normalized to some standard in order to provide an accurate depiction of the current precipitation density for each cell. This is achieved by averaging techniques. For example, one method of normalizing the precipitation density data is to average the data for all of the subscribers in a cell for a plurality of successive time periods. In that regard, each of the three forms of precipitation density data, i.e., downstream power data, downstream SNR data, and upstream transmit power data, can be collected at the central office control system 112 at periodic intervals, such as every fifteen minutes. The data from each subscriber in a particular cell is then averaged with the data from other subscribers in that cell for that particular form of data to provide three data average numbers for that particular time period.

More specifically, downstream SNR data is collected at the central control office during a first time period from all of the subscribers in a particular cell. The downstream SNR data for all of the subscribers in that cell during that period is then averaged to provide a downstream SNR data average for that cell for the first time period. This process is also performed for the downstream power data to provide a downstream power data average for the first time period. Similarly, this process is performed for the upstream transmit power data to provide an upstream transmit power data average for each time period for each cell. The three averaged data numbers are stored for each time period and then averaged over a 24 hour period. The current data averages for each of the three different forms of data are then compared with the averages for each of the types of data over the last 24 hours to produce a differential average signal for each of the three different types of precipitation density data.

FIG. 3 also illustrates an example of one embodiment for displaying the differential average data for at least one form of the precipitation density data. For example, FIG. 3 may illustrate the differential average data for the downstream SNR data. In the example shown in FIG. 3, only three levels of differential average data are displayed. Of course, multiple levels of differential average data can be provided with different degrees of shading and/or color to indicate intensity of the atmospheric precipitation density. For example, FIG. 3 shows a number of cells, such as cell 304, having a small precipitation density that outline a storm 320. Included within the outline of the storm 320 are a number of cells, such as cells 310, 314, having medium precipitation density. Storm 320 also includes cells 316, 318 that have a large precipitation density. Cells 316, 318 indicate the most severe portion of the storm 320. Similarly, FIG. 3 illustrates storm 322 that includes numerous cells, such as cell 308, having small precipitation density that form an outline of the storm 322. In addition, storm 322 includes several cells, such as cell 312, that include medium density precipitation. Cell 326 has a large precipitation density. Storm 324 is a smaller storm that has several cells, such as cell 306, with a small precipitation density, and one cell 326 with medium precipitation density.

As also shown in FIG. 3, cell 302 is indicated as a cell of interest. Cell 302 may be a cell in which a gateway is located, such as gateway 104, illustrated in FIGS. 1A and 1B, or cell 302 may be a cell for a particular subscriber. The display illustrated in FIG. 3 is a close view of the cells 202, illustrated in FIG. 2, which illustrates a predetermined number of cells in each direction from the cell of interest 302. The number of cells displayed in each direction from the cell of interest 302 can be modified as desired. If cell 302 constitutes a cell in which a gateway is located, the system operators can determine if atmospheric precipitation density is currently affecting the operation of the gateway by simply viewing the displays, such as the display illustrated in FIG. 3. If it is determined that a gateway is being affected by atmospheric precipitation density, the central office control system may wish to route transmissions through a different gateway via ground link 116 (that is shown in FIGS. 1A and 1B). If the cell of interest 302 is a cell of a particular subscriber, the central office control system can respond to telephone calls from subscribers within cell 302 and indicate that the reason for an interruption in service or a degradation in the service is the result of a storm.

Figure 4:
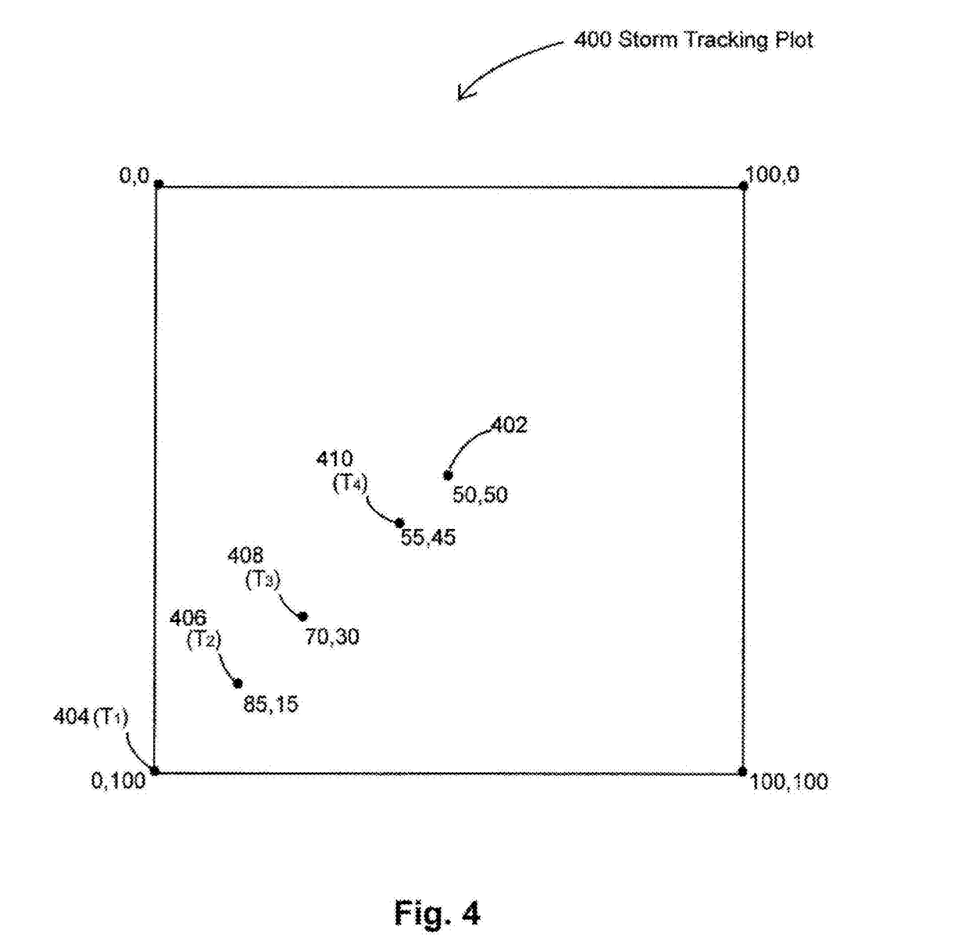
FIG. 4 is a schematic illustration of a storm tracking plot.

FIG. 4 is a plot 400 that plots the movement of a storm to provide storm tracking and prediction of storm movement. Both the location, velocity and direction of the storm can be tracked using this technique. FIG. 4 illustrates a plot 400, similar to FIG. 3, but with 100 cells shown in each direction. The central office control system analyzes the data and determines the closest cell to the cell of interest 402 that has a large precipitation density. For example, cell 316 (FIG. 3) is the closest cell in storm 320 to the cell of interest 302 that has a large precipitation density. Cell 318 also has a large precipitation density, but is farther from cell 302 than cell 316. Hence, cell 316 is the cell that would be recorded for the purposes of storm tracking in FIG. 4. With regard to storm 322, only one cell, i.e., cell 326, has a large precipitation density. Hence, cell 326 would be the cell that is recorded, for the purposes of storm tracking, in plot 400 of FIG. 4. With regard to storm 324, there are no cells that have a large precipitation density. Hence, no cells from storm 324 would be plotted in plot 400 of FIG. 4.

FIG. 4 shows the plot of a storm over four successive time periods. For the storm plotted in FIG. 4, the closest cell to the cell of interest 402, having a large precipitation density, is located at point 404, at position 0, 100, at time T1. At the next time period (T2), the closest cell showing large precipitation density for that storm is located at point 406, at position 85, 15. At the third time period (T3), which is fifteen minutes later than the second time period (T2), the closest cell showing large precipitation density is located at point 408, at position 70, 30. At the fourth time period (T4), the closest cell having large precipitation density is located at point 410, at position 55, 45. From this data, it can be easily calculated that a storm having large precipitation density will be located over the cell of interest 402, at position 50, 50, five minutes after the fourth time period (T4). This is the result of the fact that storms normally track in a linear fashion over short time periods, such as time periods of one hour or less, and smaller distances of several tens of miles. Hence, the tracking and plotting of storms can be performed in an automated fashion and predictions can be made as to when a storm will be located over a particular cell. With this information, the central office control system 112 can send alerts to individual subscribers located in specific cells indicating when the subscribers may lose service, the duration of the loss of service and warn subscribers about severe weather. Computer programs can be provided on the computer system 128 of the subscribers, which can provide an auditory and/or visual alert to subscribers that severe weather will affect their area at a particular time. This time can be accurately predicted for the subscribers in each cell, such as each of the cells illustrated in FIG. 3, so as to provide valuable, potentially lifesaving information.

An additional form of averaging can also used. Since some cells may have more subscribers than other cells, the data from adjacent cells is also averaged. For example, the data from a particular cell may be averaged with the data from the two adjacent cells in each direction to provide additional normalization of the data. This technique provides a degree of edge smoothing of the data and greater normalization.

Hence, the disclosed embodiments provide a system which automatically tracks the position and velocity of storms to be able to predict the movement of storms and provide this information to subscribers. In addition, weather that may affect a gateway, such as gateway 104, can be predicted, so that data can be re-routed to other gateways, if necessary. Three different types of precipitation density data are collected and can be compared to provide more accurate information. Since the downstream signals are transmitted at 20 GHz, and the upstream signals are transmitted at 30 GHz, differences in the attenuation of these signals can be used to provide even more data regarding the amount of attenuation caused by atmospheric precipitation density.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for mitigation of service disruptions related to atmospheric conditions in a satellite communication system performed by a satellite control system, the method comprising:
    receiving, from a satellite modem termination system, upstream transmit power data from a plurality of subscriber stations in a service area of a satellite, the upstream transmit power data encoded in subscriber transmitted signals sent by the plurality of subscriber stations to the satellite modem termination system via the satellite;
    processing the upstream transmit power data to generate precipitation density information for each of a plurality of cells of the service area for each of a plurality of time periods;
    calculating velocity and direction of movement of a storm based on the precipitation density information for the plurality of cells over the plurality of time periods to obtain predicted precipitation density information for the storm for at least one time period that is subsequent to the plurality of time periods;
    predicting, for the at least one time period, that the storm will cause a service disruption for one or more subscriber stations of the plurality of subscriber stations; and
    performing a mitigation action related to service for the one or more subscriber stations based on the predicted service disruption for the at least one time period.

2. The method of claim 1, wherein:
    the predicted service disruption comprises a disruption to communication for subscriber data between a gateway and the satellite based on the predicted precipitation density information for the storm; and
    performing the mitigation action comprises routing, for the at least one time period, the subscriber data for communication between at least one other gateway and the satellite for communication with the one or more subscriber stations.

3. The method of claim 1, wherein:
    the predicted service disruption comprises a loss of service for the one or more subscriber stations; and
    performing the mitigation action comprises sending alerts to the one or more subscriber stations indicating when the predicted loss of service will occur, the duration of the predicted loss of service, or a combination thereof.

4. The method of claim 1, further comprising:
    receiving downstream signal level data based on signals transmitted from the satellite and received at the plurality of subscriber stations, wherein the downstream signal level data comprises at least one of signal-to-noise ratio data of the signals transmitted from the satellite and received at the plurality of subscriber stations, signal strength data of the signals transmitted from the satellite and received at the plurality of subscriber stations, or a combination thereof; and
    processing the downstream signal level data to generate the precipitation density information for each of the plurality of time periods.

5. The method of claim 4, wherein the precipitation density information is further based on differences of attenuation between the downstream signal level data and upstream transmit power data.

6. The method of claim 1, wherein processing the upstream transmit power data comprises:

normalizing the upstream transmit power data by averaging the upstream transmit power data over the plurality of time periods to produce averaged upstream transmit power data;
comparing the upstream transmit power data for a current time period with the averaged upstream transmit power data to generate differential upstream transmit power data that is representative of atmospheric precipitation density.

7. The method of claim 6, further comprising:
identifying one of a plurality of atmospheric precipitation density levels for each of the plurality of cells for one or more of the plurality of time periods based on the differential upstream transmit power data.

8. The method of claim 6, further comprising:
graphically displaying the differential upstream transmit power data to produce a graphical representation of the atmospheric precipitation density.

9. The method of claim 6, wherein normalizing the upstream transmit power data further comprises:
averaging the averaged upstream transmit power data for at least one of the plurality of cells with averaged upstream transmit power data for one or more adjacent cells.

10. The method of claim 1, wherein performing the mitigation action comprises conveying information related to movement of the storm to the one or more subscriber stations.

11. A system for mitigation of service disruptions related to atmospheric conditions in a satellite communication system, comprising:
a satellite control system configured to:
receive, from a satellite modem termination system, upstream transmit power data from a plurality of subscriber stations in a service area of a satellite, the upstream transmit power data encoded in subscriber transmitted signals sent by the plurality of subscriber stations to the satellite modem termination system via the satellite;
process the upstream transmit power data to generate precipitation density information for each of a plurality of cells of the service area for each of a plurality of time periods;
calculate velocity and direction of movement of a storm based on the precipitation density information for the plurality of cells over the plurality of time periods to obtain predicted precipitation density information for the storm for at least one time period that is subsequent to the plurality of time periods;
predict, for the at least one time period, that the storm will cause a service disruption for one or more subscriber stations of the plurality of subscriber stations; and
perform a mitigation action related to service for the one or more subscriber stations based on the predicted service disruption for the at least one time period.

12. The system of claim 11, wherein the predicted service disruption comprises a disruption to communication of subscriber data between a gateway and the satellite based on the predicted precipitation density information for the storm, and wherein the satellite control system is configured to route, for the at least one time period, the subscriber data for communication between at least one other gateway and the satellite for communication with the one or more subscriber stations.

13. The system of claim 11, wherein the predicted service disruption comprises a loss of service for the one or more subscriber stations, and wherein the satellite control system is configured to send alerts to the one or more subscriber stations indicating when the predicted loss of service will occur, the duration of the predicted loss of service, or a combination thereof.

14. The system of claim 11, wherein the satellite control system is configured to:
receive downstream signal level data based on signals transmitted from the satellite and received at the plurality of subscriber stations, wherein the downstream signal level data comprises at least one of signal-to-noise ratio data of the signals transmitted from the satellite and received at the plurality of subscriber stations, signal strength data of the signals transmitted from the satellite and received at the plurality of subscriber stations, or a combination thereof; and
process the downstream signal level data to generate the precipitation density information for each of the plurality of time periods.

15. The system of claim 14, wherein the precipitation density information is further based on differences of attenuation between the downstream signal level data and upstream transmit power data.

16. The system of claim 11, wherein the satellite control system is configured to:
normalize the upstream transmit power data by averaging the upstream transmit power data over the plurality of time periods to produce averaged upstream transmit power data;
compare upstream transmit power data for a current time period with the averaged upstream transmit power data to generate differential upstream transmit power data that is representative of atmospheric precipitation density.

17. The system of claim 16, wherein the satellite control system is configured to:
identify one of a plurality of atmospheric precipitation density levels for each of the plurality of cells for one or more of the plurality of time periods based on the differential upstream transmit power data.

18. The system of claim 16, wherein the satellite control system is configured to:
graphically display the differential upstream transmit power data to produce a graphical representation of the atmospheric precipitation density.

19. The system of claim 16, wherein the satellite control system is configured to:
average the averaged upstream transmit power data for at least one of the plurality of cells with the averaged upstream transmit power data for one or more adjacent cells.

20. The system of claim 11, wherein the satellite control system is configured to convey information related to movement of the storm to the one or more subscriber stations.

* * * * *